Figure 1:
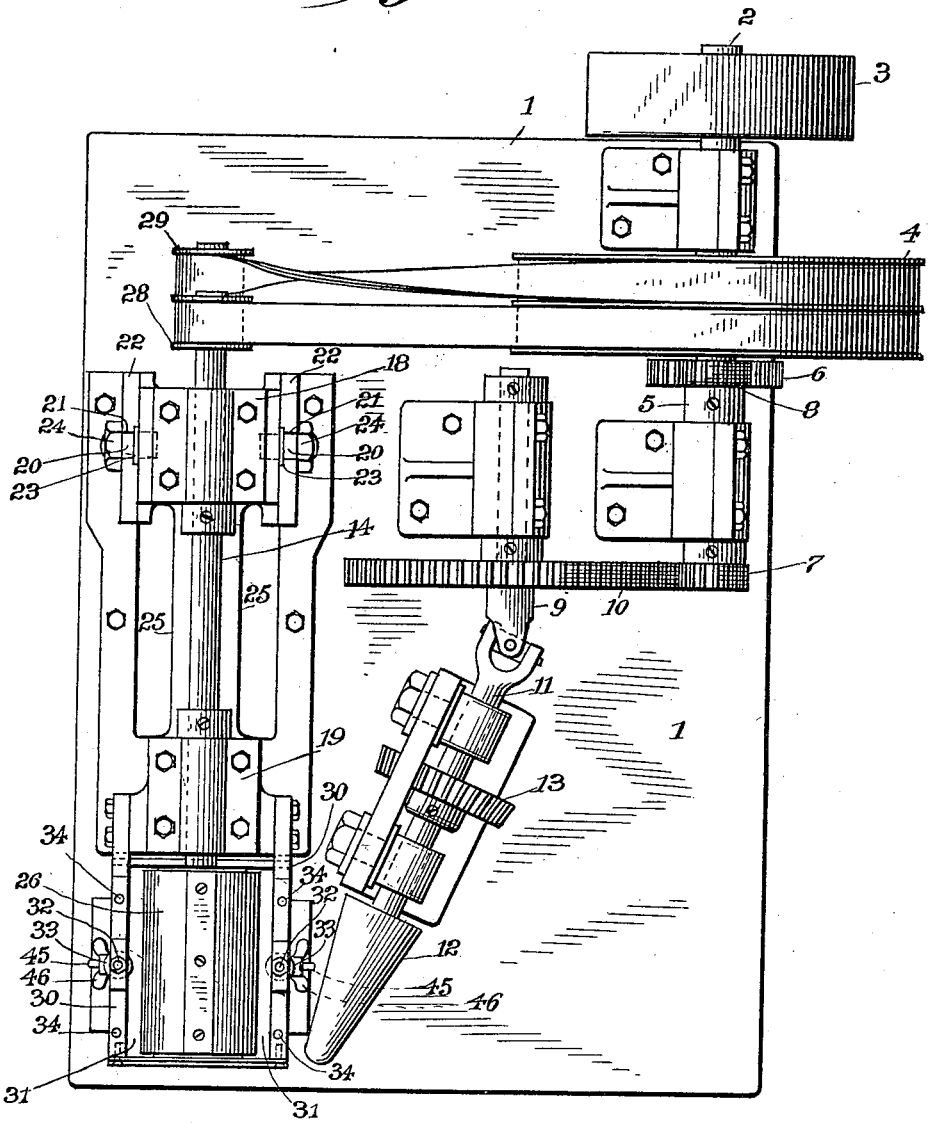

No. 631,985.  
G. E. BRUSH.  
HAT POUNCING MACHINE.  
(Application filed Apr. 7, 1899.)

(No Model.)

Patented Aug. 29, 1899.

2 Sheets—Sheet 1.

WITNESSES:

INVENTOR  
Geo. E. Brush  
BY  
ATTORNEY

No. 631,985. Patented Aug. 29, 1899.
G. E. BRUSH.
HAT POUNCING MACHINE.
(Application filed Apr. 7, 1899.)
(No Model.) 2 Sheets—Sheet 2.
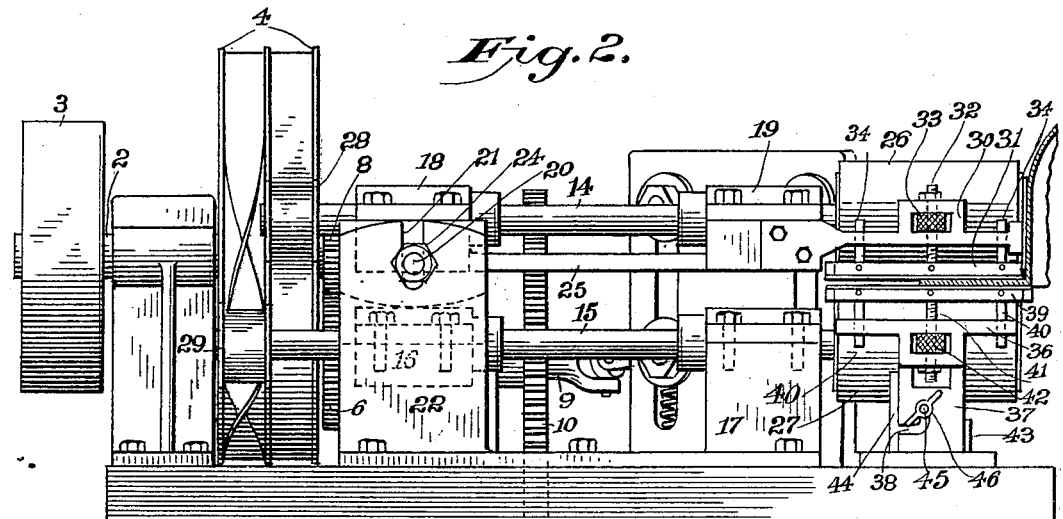
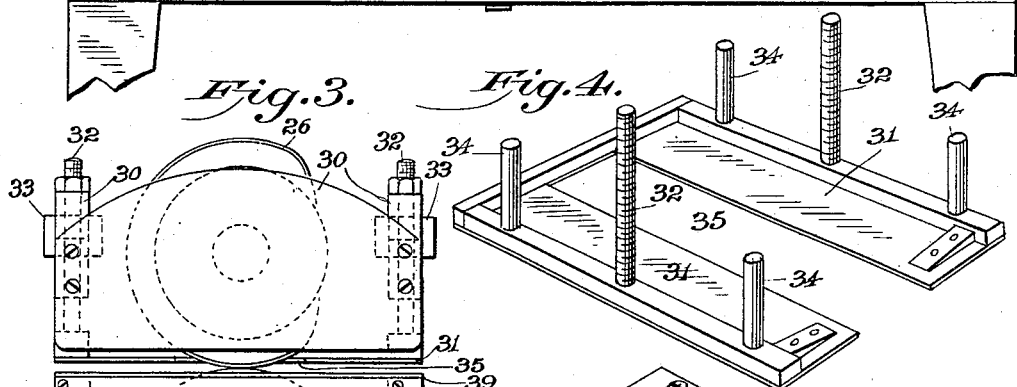
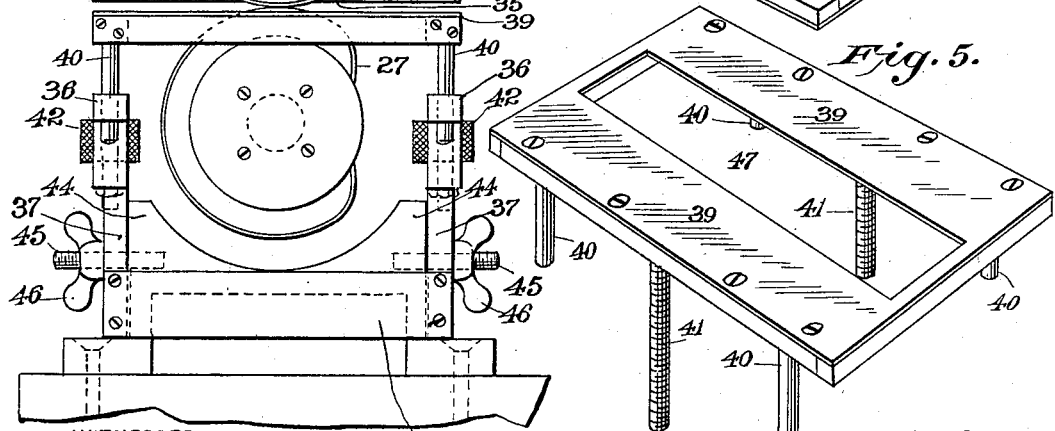
WITNESSES:
J. F. Finch.
M. I. Lougden.
INVENTOR
Geo. E. Brush
BY
J. T. Smith Jr.
ATTORNEY

UNITED STATES PATENT OFFICE.

GEORGE E. BRUSH, OF DANBURY, CONNECTICUT.

HAT-POUNCING MACHINE.

SPECIFICATION forming part of Letters Patent No. 631,985, dated August 29, 1899.

Application filed April 7, 1899. Serial No. 712,170. (No model.)

*To all whom it may concern:*

Be it known that I, GEORGE E. BRUSH, a citizen of the United States, residing at Danbury, in the county of Fairfield and State of Connecticut, have invented certain new and useful Improvements in Hat-Pouncing Machines; and I do hereby declare the following to be a full, clear, and exact description of the invention, such as will enable others skilled in the art to which it appertains to make and use the same.

My invention relates to hat-pouncing machines, but more particularly has reference to the pouncing-pads and the appliances used in immediate connection therewith for pouncing the brims of hats, and has for its objects to prevent the pads from gouging the brims and to regulate the depth to which the sandpaper around the pads may cut.

In the accompanying drawings, Figure 1 is a plan view of a hat-pouncing machine embodying my improvement; Fig. 2, a side elevation thereof; Fig. 3, a front elevation, and Figs. 4 and 5 are respectively detail perspectives of the upper and lower "go-betweens."

Similar numbers of reference denote like parts in the several figures of the drawings.

In an application for Letters Patent for improvement in pads for pouncing the crowns of hats, filed by me on even date herewith under Serial No. 712,169, I have shown and described a pouncing-pad similar in all respects to the pad herein illustrated, and in said application I have also shown and described go-betweens which regulate the depth to which the pad may cut into the hat, and in the present instance the construction of the pad and the function of the go-betweens are the same as is shown and described in said application; but in utilizing these pads and go-betweens for pouncing the brims of hats the arrangement of parts is somewhat different and necessitates a construction which of itself amounts to invention, and the main object, therefore, of the present improvement is to utilize the rotary pads and the go-betweens in said pending application for the purpose of pouncing the brims of hats.

1 is the bed-plate; 2, the power-shaft; 3, the power-pulley; 4, a double pulley carried by said shaft; 5, a short shaft suitably journaled in boxes supported on the bed and carrying at one end spur-gears 6 and at the other end a pinion 7, with which spur-gear meshes a pinion 8, carried by the shaft 2; 9, a short shaft suitably journaled in boxes supported on the bed and carrying large spur-gear 10, which meshes with the pinion 7; 11, a shaft flexibly connected to the shaft 9 and carrying at its outer extremity one of the conical feed-rolls 12 for the hat-brim, said shaft 11 being journaled and supported within suitable boxes rising from the bed, and 13 is a gear carried by the shaft 11 and meshing with a similar gear carried by the shaft of the lower feed-roll, (not shown,) whereby the two feed-rolls may revolve to accomplish their proper functions.

All of the parts heretofore referred to in their assembled form as a unitary construction are old and well known in the art of hat-pouncing machines, and therefore they form no part of the present invention, and it is deemed sufficient to state that the feed-rolls grasp the hat-brim and deliver it properly between the pouncing-pads.

I will now describe the mechanism that is most intimately related to the present improvement and by means of which the results aimed at are brought about.

14 15 are shafts, the latter journaled in suitable stationary boxes 16 17, supported on the bed 1, while the former is journaled within boxes 18 19 above the shaft 15. From opposite sides of the box 18 project studs 20 through vertical slots 21 in uprights 22, which are bolted to the bed. These studs are perfectly loose within suitable openings in the box 18, so that the latter is at all times free to turn on said studs as pivotal points, and said studs are provided with collars 23, which abut against the inner walls of the uprights 22, while the outer ends of these studs are threaded and are provided with nuts 24, so that the box 18 may be raised to any desired adjustment and then secured by tightening these nuts, for the purpose presently to be explained. The box 19 is connected with the box 18 by means of the rods 25.

On the outer extremities of the shafts 14 15 are secured the pouncing-pads 26 27, which are precisely the same both as to construction and arrangement as the pads shown in the pending application above referred to, and I will therefore enter into no description herein of the same. 28 29 are small pulleys carried by the inner ends of these shafts 14 15 and belted up to the double pulley 4, the belt for one of these small pulleys being twisted so that the pads will revolve in opposite directions. The shafts 14 15 being journaled and supported one above the other, it will be clear that the hat-brims are introduced between these pads and properly guided by means of the feed-rolls, and I will now describe the means which I employ to insure the pouncing of the hat to a uniform depth without any irregular gouging or cutting.

30 is a frame projecting from the box 19 on opposite sides of the pad 26, and 31 is a tray suspended beneath said frame by threaded pins 32, which extend upwardly through the frame on opposite sides of the pad and are engaged by nuts 33, which latter are confined as against any movement lengthwise of the pins. Suitable dowel-pins 34 extend upwardly through perforations in the frame, so that the tray will be steadied as it is adjusted up and down by the manipulation of these nuts. This tray extends below the upper pad and is open nearly throughout its length, as seen at 35, so that the pad may project therethrough in the manner shown at Fig. 3. 36 is likewise a frame which has depending therefrom legs 37, which latter are provided with gates 38, which open into the inner edges of these legs, said gates extending in a horizontal plane for a short distance from said edges, and thence deflected upwardly for the purpose presently to be explained.

39 is a tray provided with dowels 40, which project through suitable openings in the frame 36 and also provided with a threaded pin 41, which depends through the frame 36 and is engaged by a thumb-nut 42, confined in said frame as against any movement lengthwise of the pin.

43 is a cross-piece secured to the front edges of the legs 37 at their bases for the purpose of strengthening the structure.

44 is a block secured to the bed 1 immediately below the lower pad, and from opposite sides of this block project short pins 45. The frame 36 is secured in position by sliding the legs 37 along the sides of this block until the pins 45 have entered the gates 38, whereupon the legs are allowed to rest against the base of the block, thereby bringing the pins up into the deflected portions of these gates. 46 are thumb-nuts driven on said pins 45, and whereby the legs may be held firmly in position on opposite sides of the block.

The tray 39 has an opening 47, through which the lower pad projects, so that it will be clear that the upper and lower pads can reach the hat-brim only through the openings 35 47 in the trays, and that the extent to which these pads project through these openings and therefore beyond the trays is regulated by the manipulations of the nuts 33 42. These trays, with their dowels and adjusting appliances, I style "go-betweens," and I shall hereinafter refer to them as such, both in the further description and the claims.

It will be observed that the upper go-between is open at its outer edge, while the lower go-between is closed in this respect, and the object of this open construction is to enable the upper pad to work close to the crown of the hat at the angle formed by the junction of said crown and the brim, whereas in the instance of the lower go-between no such provision is necessary and therefore the ends are closed.

The object of the construction which supports the frame and go-between for the lower pad is to facilitate the removal of the sandpaper from the lower pad, as well as the placing therearound of fresh sandpaper, for by loosening the nuts 46 and raising the legs until the horizontal parts of the gates come in line with the pins 45 the entire structure comprising these legs, frame 36, and lower go-between may be removed bodily, thus throwing the lower pad open for inspection and for the removal or supply of sandpaper.

These go-betweens are independently adjustable, and should it be discovered that one of the pads was cutting in too deeply the go-between immediately beyond the same would be adjusted farther away from the pad, so that the latter would project to a less extent through such go-between.

Hats sometimes run very irregular as to thickness, and it is frequently true that the thickest portion of the brim is near the crown or near the outer edges. When the brim is thicker near the crown, it becomes desirable that the pad should cut away such portion without materially affecting the rest of the brim, and this is accomplished by simply loosening the nuts 24 and elevating the rear portion of the shaft 14 and securing it in such elevated position by again tightening the nuts. This will cause the outer portion of the upper pad to bite deeper into that portion of the brim nearer to the crown, while the rear part of this pad will be elevated away from the rest of the brim. The depression of the rear portion of this shaft 14 will cause the pad to bite harder against that portion of the brim farther away from the crown, and this is rendered necessary when such portion of the brim is the thickest.

Of course these go-betweens may be constructed in various ways; but I do not wish to be limited to any particular shape or construction of go-betweens, since my invention resides in the broad idea of providing the upper and lower pads of a brim-pouncer with adjustable go-betweens, which regulate and determine the depth to which these pads may cut into the hat-brim.

In the present application I do not, of course, wish to be understood as laying any broad claim to a go-between interposed between a pouncing-pad and hat as a means for determining the extent to which the pad may cut into the hat, since this broad claim is the feature of my pending application above referred to, it being the aim of the present application to cover the use of go-betweens in connection with brim-pouncing pads only.

Having thus described my invention, what I claim as new, and desire to secure by Letters Patent, is—

1. In a machine for pouncing the brims of hats, the combination of the rotary pouncing-pads capable of revolving in opposite directions one above the other, with adjustable go-betweens supported independent of said pads and immediately beyond the latter, substantially as set forth.

2. In a machine for pouncing the brims of hats, the combination of the pouncing-pads supported one above the other and capable of revolution in opposite directions, the adjustable go-betweens supported independent of said pads and immediately beyond the latter, and means for adjusting the upper pad in an inclined plane, substantially as set forth.

3. In a machine for pouncing the brims of hats, the combination of the lower shaft carrying at its extremity the lower pouncing-pad, the upper shaft carrying on one extremity the upper pouncing-pad and pivoted at its other extremity within a supporting journal-box, means for vertically adjusting said box, and go-betweens immediately beyond said pads and supported independent thereof, substantially as set forth.

4. In a machine for pouncing the brims of hats, the combination of the two shafts journaled one above the other and having pouncing-pads secured at their outer extremities, the uppermost of said shafts being pivoted at its rear end within a vertically-adjustable box, and adjustable go-betweens supported immediately beyond said pads and independent thereof, substantially as set forth.

5. In a machine for pouncing the brims of hats, the combination of the pads one above the other and capable of revolving in opposite directions, the go-betweens supported independent of said pads and beyond the same, means for delivering and feeding the hat-brim intermediate of said go-betweens, and means for adjusting the upper pad in inclined planes, substantially as set forth.

6. In a machine for pouncing the brims of hats, the combination of the lower shaft carrying at its outer end the lower pouncing-pad, the upper shaft journaled at its rear extremity within a pivoted journal-box and carrying at its outer end the upper pouncing-pad, means for vertically adjusting said box, the go-betweens secured in position immediately below the upper pad, the detachable frame secured in position in proximity to the lower pad, and the go-between secured to said frame and extending immediately above the lower pad, substantially as set forth.

7. In a machine for pouncing the brims of hats, the combination of the rotatory pouncing-pads supported one above the other, the go-betweens open throughout their length and supported independent of said pads immediately beyond the latter, and means for independently adjusting said go-betweens, substantially as set forth.

In testimony whereof I affix my signature in presence of two witnesses.

GEORGE E. BRUSH.

Witnesses:
J. S. FINCH,
M. I. LONGDEN.